United States Patent

Kopp, Jr. et al.

[11] Patent Number: 5,810,604
[45] Date of Patent: Sep. 22, 1998

[54] ELECTRONIC BOOK AND METHOD

[75] Inventors: Richard L. Kopp, Jr., Mesa; Derrill P. Williams, Scottsdale, both of Ariz.

[73] Assignee: Pioneer Publishing, Mesa, Ariz.

[21] Appl. No.: 579,900

[22] Filed: Dec. 28, 1995

[51] Int. Cl.[6] ............................................ G09B 5/00
[52] U.S. Cl. ..................... 434/317; 434/169; 200/5 A; 200/512; 345/173; 345/901
[58] Field of Search ..................... 434/169, 178, 434/185, 307 R, 308, 317, 338; 462/2, 7, 8, 17, 71, 76; 361/179; 362/98, 394, 806; 200/5 A, 46, 67, 512; 345/77, 106, 173, 214, 901; 40/124.01, 901

[56] References Cited

U.S. PATENT DOCUMENTS

| | | |
|---|---|---|
| 4,389,711 | 6/1983 | Hotta et al. . |
| 4,564,079 | 1/1986 | Moore et al. . |
| 4,570,149 | 2/1986 | Thornburg et al. . |
| 4,706,536 | 11/1987 | Sanders . |
| 4,752,230 | 6/1988 | Shimizu . |
| 4,778,391 | 10/1988 | Weiner . |
| 4,809,246 | 2/1989 | Jeng . |
| 4,818,827 | 4/1989 | Ipcinski et al. . |
| 4,990,092 | 2/1991 | Cummings . |
| 5,209,665 | 5/1993 | Billings et al. . |
| 5,290,190 | 3/1994 | McClanahan . |
| 5,356,296 | 10/1994 | Pierce et al. . |
| 5,374,195 | 12/1994 | McClanahan . |
| 5,417,575 | 5/1995 | McTaggart . |
| 5,437,552 | 8/1995 | Baer et al. . |
| 5,453,013 | 9/1995 | Billings et al. . |
| 5,484,292 | 1/1996 | McTaggart ............................ 434/317 |

FOREIGN PATENT DOCUMENTS

WO 92/18964  10/1992  WIPO .

*Primary Examiner*—Joe Cheng
*Attorney, Agent, or Firm*—Cahill, Sutton & Thomas P.L.C.

[57] ABSTRACT

An electronic book includes a cover, an array of membrane switches disposed in a membrane switch assembly attached to the cover, and a plurality of pages attached to the cover, each of the pages having on a first surface thereof an indicia located directly over one of the switches, respectively. An electronic module is attached to the cover and is electrically connected to the array of switches. The electronic module stores a plurality of addressable sound sequences. The membrane switch assembly includes a first layer of flexible sheet material, and a layer of switch electrode conductors on the first layer of flexible sheet material defining a plurality of pairs of switch electrode conductors, each pair including a first electrode conductor and a second electrode conductor, and a plurality of conductors for connecting the electrode conductors to the electronic module. The membrane switch assembly also includes a second layer of flexible sheet material and a layer of electrode shorting conductors on the second layer of flexible sheet material, and a plurality of spacers disposed between the first and second layers of flexible sheet material. Each membrane switch includes one of the pairs of first electrode conductor and a second electrode conductor, one of the spacers, and one of the electrode shorting conductors.

25 Claims, 10 Drawing Sheets

ELECTRONIC BOOK AND METHOD

BACKGROUND OF THE INVENTION

The invention relates to "electronic books" or "talking books" such as those marketed for use by children, wherein each of a plurality of switches corresponding to a plurality of images, respectively, is actuated to cause the book to produce sounds, such as one or more words, associated with the corresponding image.

U.S. Pat. No. 4,990,092 (Cummings) discloses a "talking book" including a number of pages connected between two covers by a binder. The various pages have spots which overlie and are vertically aligned with switches that are formed in the back cover, such that pressure applied to a spot on any of the pages is transmitted through the remaining pages to the corresponding switch. Actuation of such switches causes activation of a voice chip located within the back cover. The voice chip sends signals to a speaker that also is located in the back cover, thereby producing audible sounds that correspond to the particular spot which was pressed.

U.S. Pat. No. 4,809,246 (Jeng) discloses a talking book including front and back covers in a loose leaf binder connected to the pages. Batteries, an electronic circuit board, a speaker, and switches are located in the back cover. Indicia on the pages indicate to the user which of the switches to manually depress to activate corresponding sound chips to cause the speaker to produce sounds corresponding to such indicia.

U.S. Pat. No. 4,818,827 (Ipcinski et al.) discloses a layer of membrane switches in a frame that is analogous to a back cover of a talking book. This reference discloses multiple pages with symbols thereon which are aligned with various membrane switches in the layer. This reference has as its object the provision of a membrane switch having only two plastic layers and screen printed conductive traces with screen printed insulating spacers in conjunction with a coating carrying symbols and instructions, wherein the membrane switch is sufficiently thin and responsive to touch that it can be actuated by pressure transmitted through multiple pages laid over the top of the switch. The Ipcinski patent teaches that electronic circuits may be contained beneath the upper surface of the frame or back cover, including a speaker for audio output and various logic and memory circuits to facilitate the intended use of the device.

Those of the prior art electronic books which have been extensively marketed have various disadvantages. Some have been quite expensive, especially on a cost per switch basis. Some have had serious reliability problems, mainly caused by open circuits resulting from "breaks" in the conductors. Furthermore, the number of switches that can be provided in a particular sized book is quite small for some of the prior art electronic books. The prior electronic books have been quite difficult to manufacture, resulting in higher manufacturing costs.

Some of the prior art electronic books require the reader to make a correlation between a particular indicia on a page and a switch that must be actuated elsewhere.

It would be very desirable to provide an electronic book which is of higher reliability, lower cost, lighter weight, and capable of having many more switches in a book of given size than any of the prior art electronic books, and/or does not require the reader to make a correlation between a particular indicia on a page and a switch located elsewhere.

SUMMARY OF THE INVENTION

Accordingly, it is an object of the invention to provide an electronic book that is less costly on a cost per switch basis than the prior art and is more reliable than the prior art.

It is another object of the invention to provide an electronic book that, for a given physical size, is lighter in weight than the prior art.

It is another object of the invention to provide an electronic book that, for a given size, is capable of including a larger number of switches than the prior art.

It is another object of the invention to provide an improved method of making a low cost, reliable, easily manufacturable electronic book.

It is another object of the invention to provide an electronic book of the type described which avoids the need for the reader to make a correlation between a particular indicia on a page and a switch to be actuated elsewhere.

Briefly described, and in accordance with one embodiment thereof, the invention provides an electronic book, including a cover, an array of membrane switches disposed in a membrane switch assembly attached to the cover, a plurality of pages attached to the cover, each of the pages having on a first surface thereof an indicia located directly over one of the switches, respectively, and an electronic module attached to the cover and electronically connected to the array of switches, the electronic module storing a plurality of sound sequences, wherein the membrane switch assembly includes a first layer of flexible sheet material, and a layer of switch electrode conductors on the first layer of flexible sheet material defining a plurality of pairs of switch electrode conductors, each pair including a first electrode conductor and a second electrode conductor, and a plurality of conductors for connecting the electrode conductors to the electronic module. In the described embodiment, the membrane switch assembly includes a second layer of flexible sheet material and a layer of electrode shorting conductors on the second layer of flexible sheet material, each electrode shorting conductor being directly above one of the pairs of switch electrode conductors, respectively. A plurality of insulative spacers are disposed between the first and second layers of flexible sheet material. Each membrane switch includes one of the pairs of a first electrode conductor and a second electrode conductor, one of the insulative spacers, and one of the electrode shorting conductors. Insulative spacers of each membrane switch separate the electrode shorting conductor from the first electrode conductor and the second electrode conductor of the membrane switch when it is not activated, and allow the second layer of flexible sheet material to be pressed against the second electrode conductor and first electrode conductor in response to pressure on the indicia corresponding to that membrane switch so that the electrode shorting conductor makes electrical contact with both the second electrode conductor and the first electrode conductor to transmit a signal corresponding to that membrane switch and that indicia via a pair of conductors to the electronic module, to thereby cause it to address a corresponding stored sound sequence. The electronic module includes a sound transducer, and the electronic module stores a voice message corresponding to each membrane switch, respectively, and causes the sound transducer to produce the voice message in response to the electrical contacting of the electrode shorting conductor to both the first electrode conductor and second conductor of that membrane switch. The membrane switches, the first electrode conductor and the second electrode conductor include a plurality of elongated semicircular, concentric sections interleaved with each other. The electrode shorting conductor includes a plurality of radial spokes extending from a central portion concentric with the elongated sections. The second electrode conductor of each of the membrane switches in any column of the array is connected to a corresponding column conductor connected to the electronic module, and wherein the anode conductor of each of the membrane switches in any row of the array is connected to a corresponding row conductor connected to the electronic module. A plurality of crossover insulators are disposed between each of a plurality of row conductors and each of a plurality of column conductors to allow the column conductors to cross over the row conductors without being electrically shorted thereto. The cover includes a front cover board and a back cover board, the membrane switch assembly including first and second portions adhesively attached to inside surfaces of the front and back cover boards, respectively, a portion of the membrane switch assembly forming a hinge and spine connecting the front and back covers. A portion of the back cover extends beyond the front cover and the electronic module is attached to such portion of the back cover, thereby allowing the front cover to clear the electronic module when the book cover is closed. One or more of the pages can include more than one indicia, and/or some of the membrane switches can be aligned with only one of the indicia, or one of the membrane switches can be aligned with a plurality of the indicia on different pages. Two or more of the membrane switches can be connected in parallel so if either of the first and second membrane switches is actuated, the same pair of conductors are electrically shorted together. A cutout is provided in the cover to allow pressure to be applied to actuate a corresponding membrane switch and produce in response a sound sequence while the cover is closed.

DETAILED DESCRIPTION OF THE PREFERRED EMBODIMENTS

Figure 1:
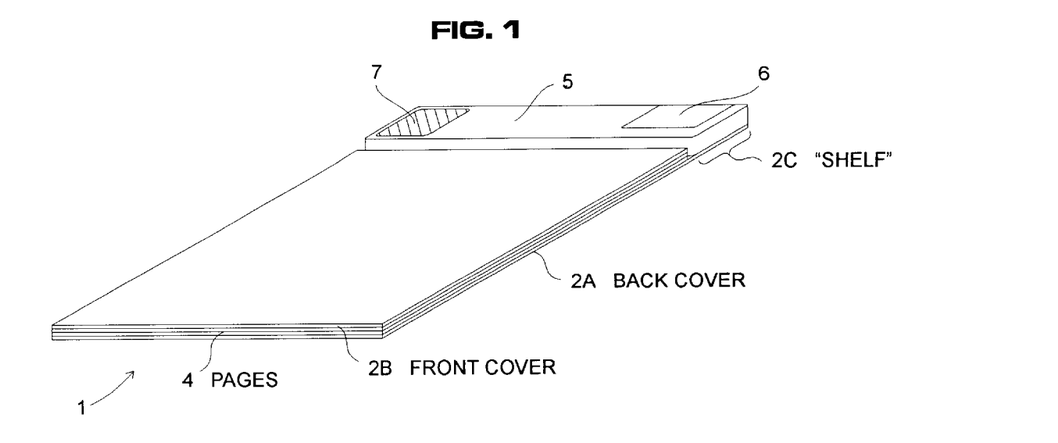
FIG. 1 is a perspective view of the electronic book of the present invention.

Referring now to the drawings, electronic book 1, shown "closed" in FIG. 1, includes a plurality of pages, collectively designated by numeral 4, connected between a back cover 2A and a front cover 2B. Back cover 2A is extended beyond the upper edge of the book to support an electronic module 5 having a speaker 7 therein and a battery cover 6.

Figure 2:
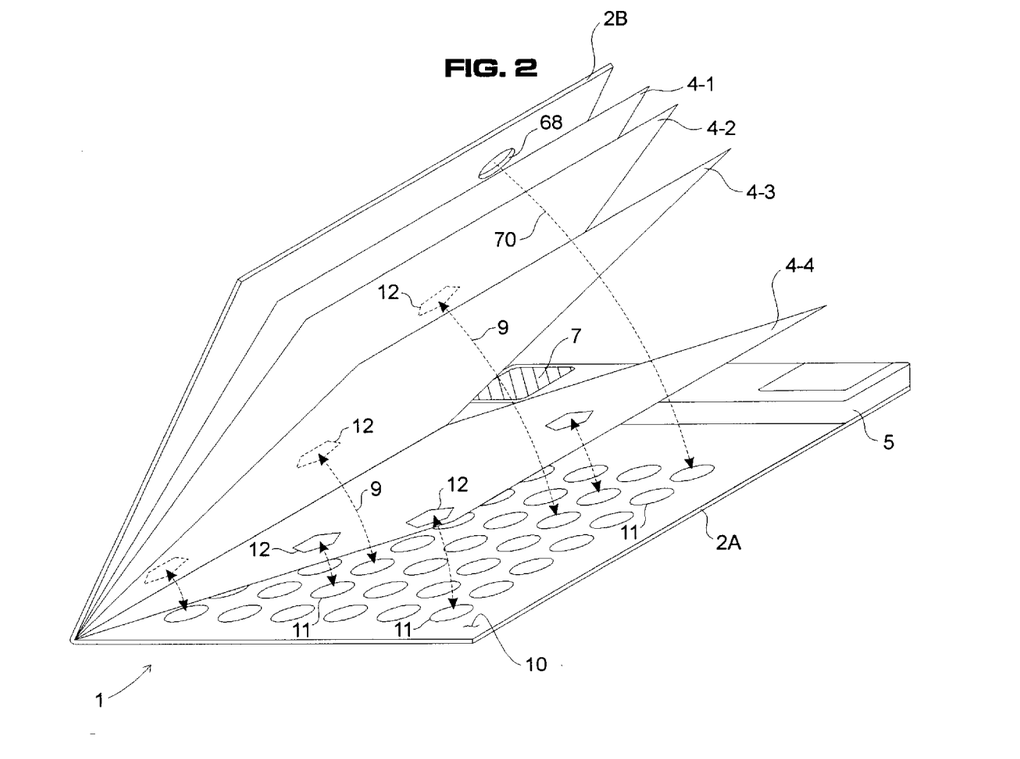
FIG. 2 is a perspective view of the electronic book of FIG. 1 partially opened to illustrate the pages, indicia thereon, and corresponding membrane switches located in the back cover.

Referring to FIG. 2, each of the pages 4-1, 2 . . . 4 has one or more indicia 12 on the "upper" surface thereof (meaning the upper surface when that page rests on back cover 2A). Dotted lines 9 indicate which of various membrane switches 11 in a MYLAR membrane switch assembly 10 correspond to the various indicia 12 on a one-to-one basis. MYLAR membrane switch assembly 10, composed of conventional 3–5 mil MYLAR sheet material, is affixed to the inside surface of back cover 2A and front cover 2B.

In accordance with the invention, no switch elements are provided in or on the various pages 4. Each page 4 has indicia 12 thereon. Any indicia 12 on any page 4 is aligned with only one membrane switch 11 when that page 4 lies flat on the back cover 2A or front cover 2B. Therefore, pressing on an indicia 12 of page 4 closes only one corresponding membrane switch 11.

Figure 10:
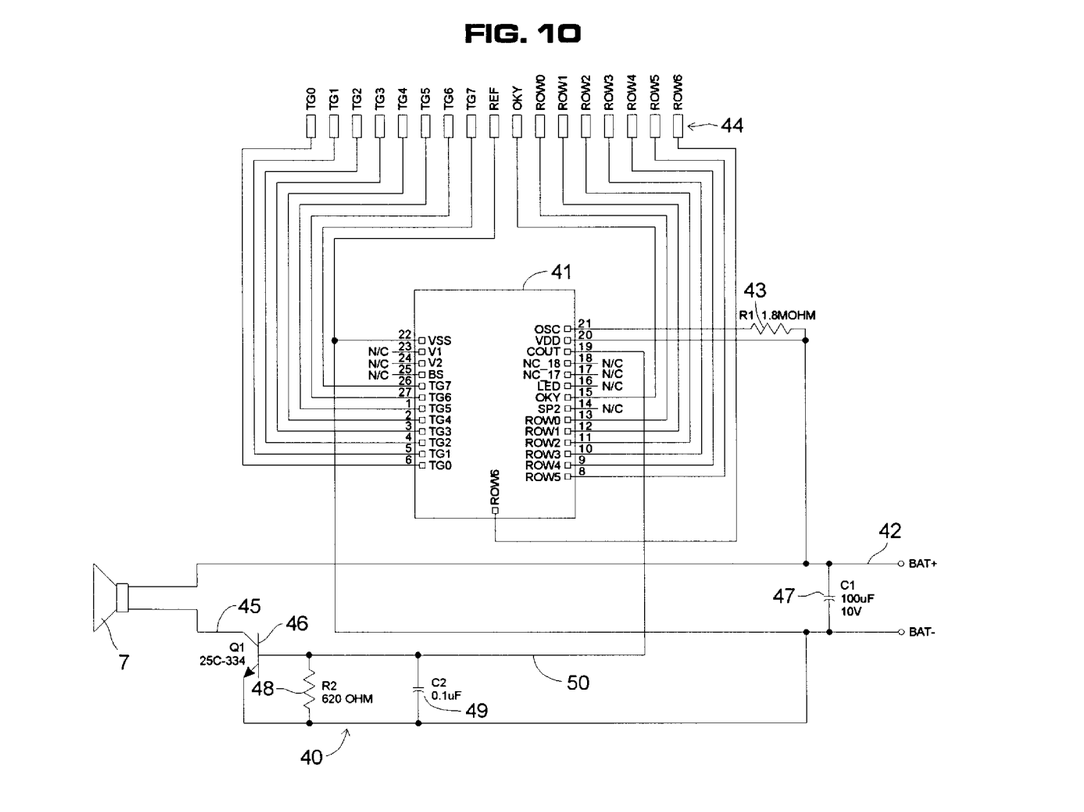
FIG. 10 is a schematic diagram of the circuitry contained in the electronic module to drive the speaker.

The closing of such membrane switch 11 is sensed by row conductors 33 and column conductors 34 in MYLAR membrane switch assembly 10. Row conductors 33 and column conductors 34 are connected to an integrated circuit sound/voice chip 41 (FIG. 10) which causes a stored pattern of sounds, including words and/or music corresponding to the "pressed" indicia 12, to be emitted by speaker 7 (FIGS. 1 and 10).

Figure 2A:
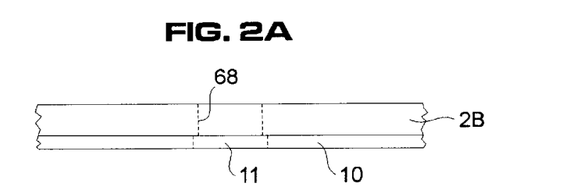
FIG. 2A is a partial section view showing an alternate embodiment of a hole or cutout 68 in FIG. 2 to expose a membrane switch on the inside of the front cover.

In FIG. 2, a hole 68 (or cutout which is not completely surrounded) through front cover 2B allows a prospective buyer to press on an exposed indicia on the upper surface of the top sheet 4-1, even though the electronic book is enclosed in a shrink wrap package or the like. Such indicia is aligned with a particular membrane switch 11A, as indicated by dotted line 70. Actuation of switch 11A causes the voice chip 41 to produce a corresponding stored message or sound sequence. FIG. 2A shows an alternate embodiment, in which a MYLAR membrane switch assembly 10 is attached to the inner surface of front cover 2B, so a membrane switch thereof aligned with cutout or hole 68 can be actuated by the prospective user. And, when the book is open, pressing any of indicia 12 on the opposite surfaces of the various sheets 41,2 etc. actuates membrane switches aligned therewith in the MYLAR membrane switch assembly 10 in the inner surface of front cover 2B.

Figure 4:
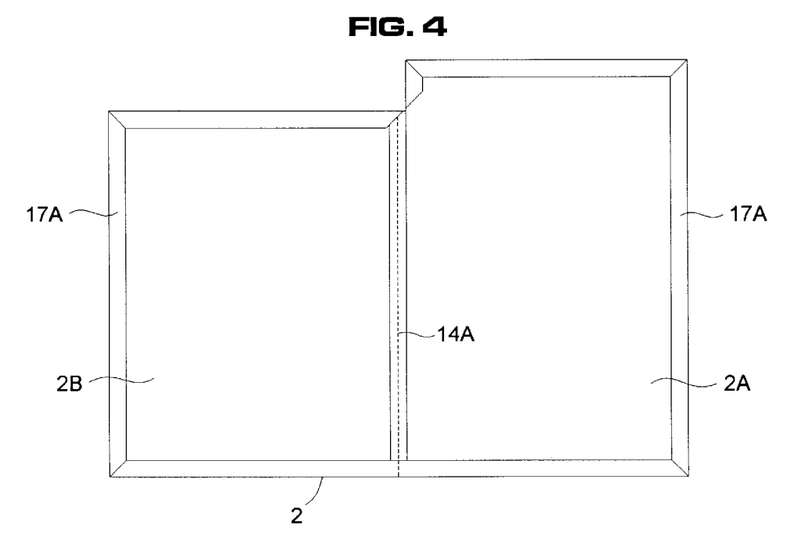
FIG. 4 is a plan view of the cover after installation of a cover sheet on the back cover board and front cover board.
Figure 7:
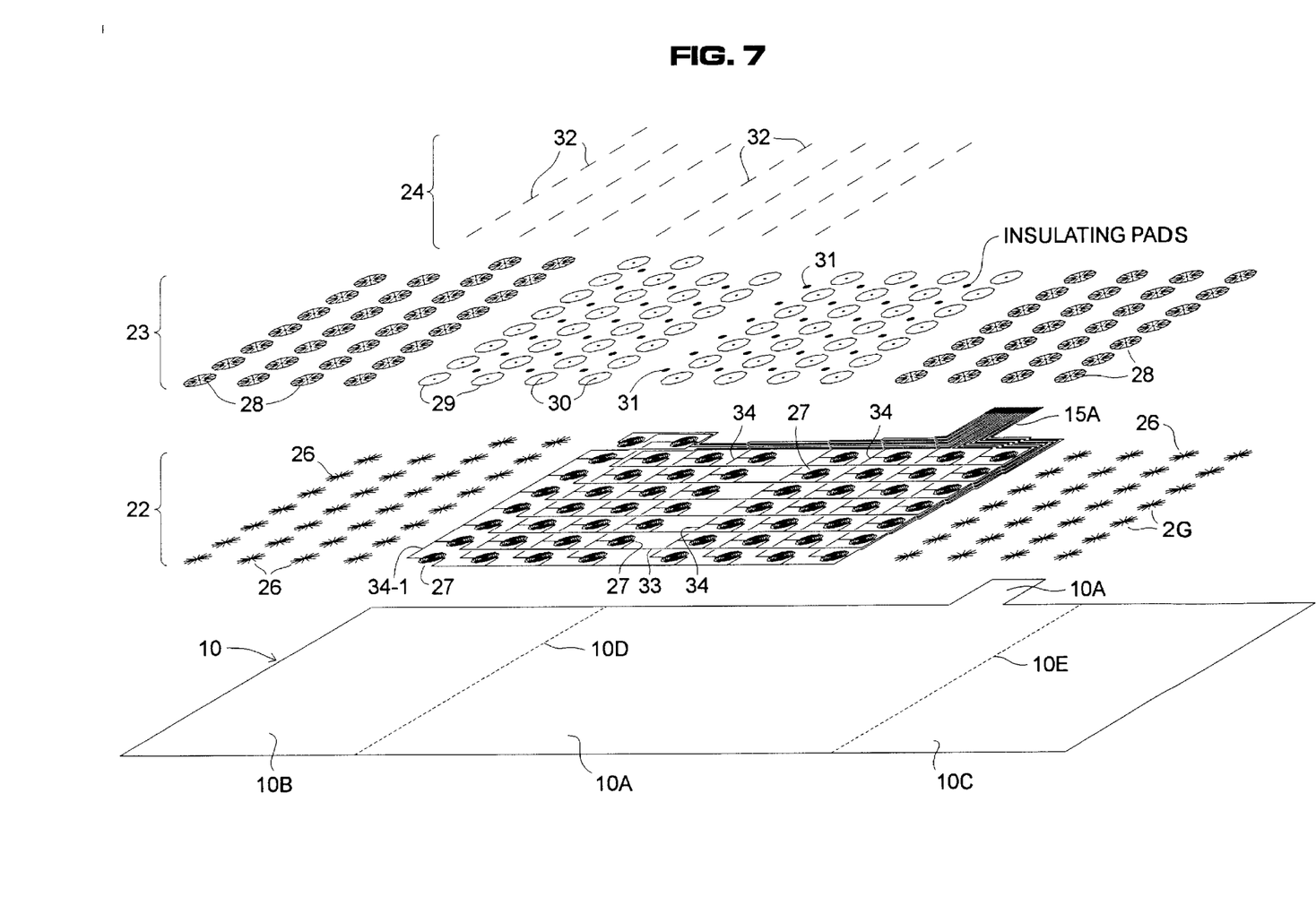
FIG. 7 is a perspective exploded view of the opened membrane switch assembly, and each of three sequential patterns printed onto a MYLAR sheet to form the membrane switches of the present invention.
Figure 8:
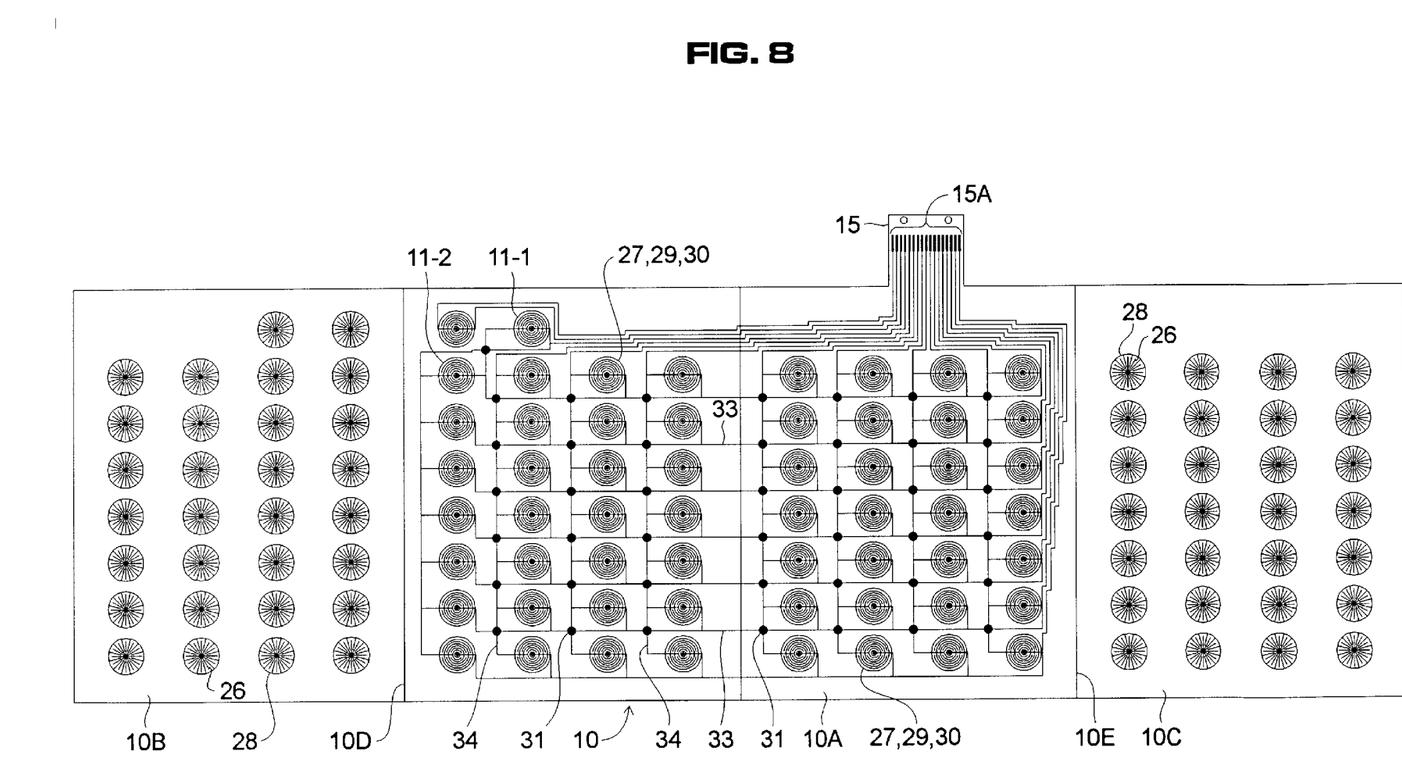
FIG. 8 is a plan view of the membrane switches after all three conductor and insulator print patterns have been formed thereon, before folding the outer leaves.
Figure 9:
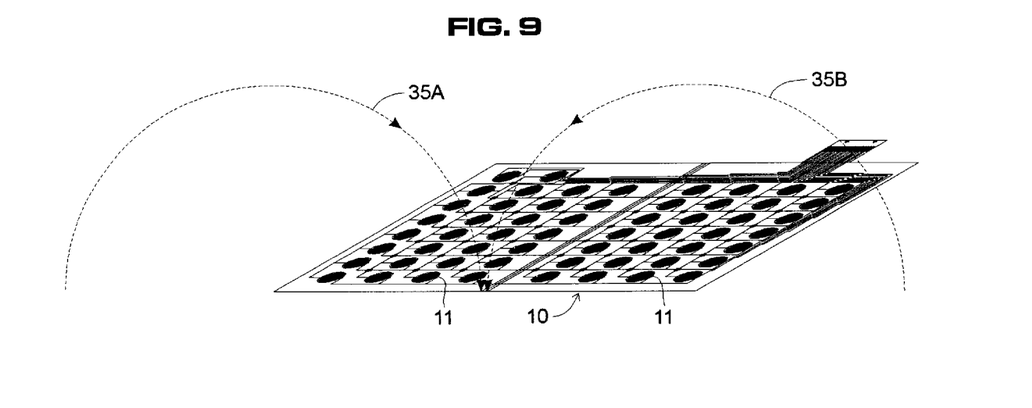
FIG. 9 is a perspective view illustrating the membrane insert after the outer leaves have been folded and attached.

Before describing the details of the individual membrane switches 11 as illustrated in FIG. 7–9, the construction of the cover, pages, and electronic module 5 of the electronic book will be described. As shown in FIG. 4, cover 2 includes back cover 2A and front cover 2B connected to be "closed" along a center line 14. As shown in FIG. 4, cover 2 includes a back cover 2A composed of light cardboard, (such as 1200 gram DAVEY board), a similar front cover 2B, with 137 gram cover paper adhesively attached to the outer surface of front cover board 2B and back cover board 2B, and folded around the edges thereof to form fold strips 17A (FIG. 4). Cover paper 17 can have artwork thereon and can be laminated to have a glossy surface.

Figure 3:
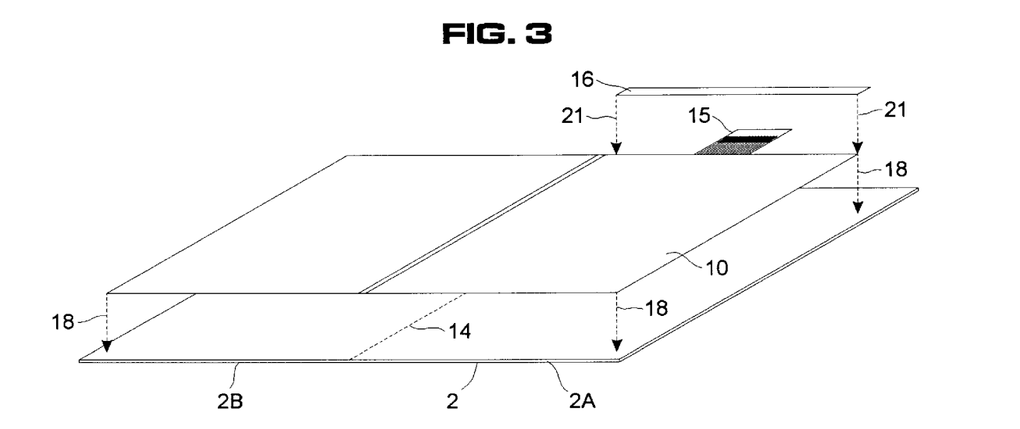
FIG. 3 is a perspective exploded view illustrating the positions of the open cover, membrane switch insert, and a cosmetic "tail" cover.
Figure 5:
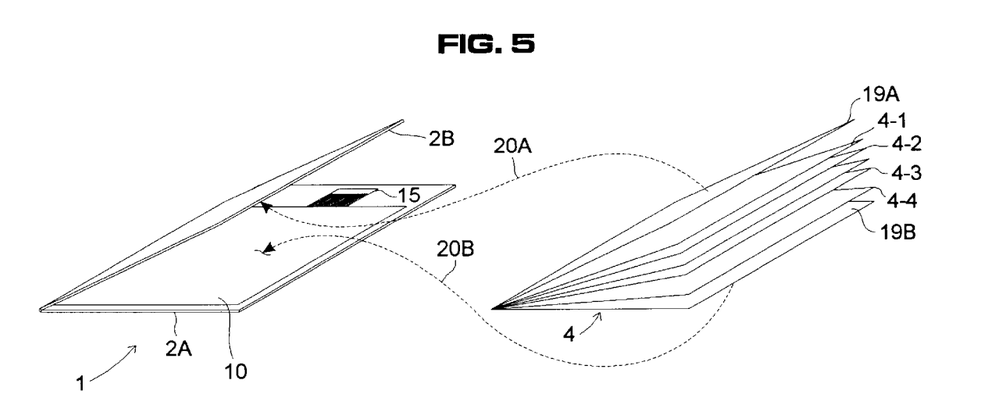
FIG. 5 is a perspective view illustrating attachment of fly sheets of a page assembly to the inside surfaces of the front and back covers after a membrane switch assembly has been positioned on the back cover.
Figure 5A:
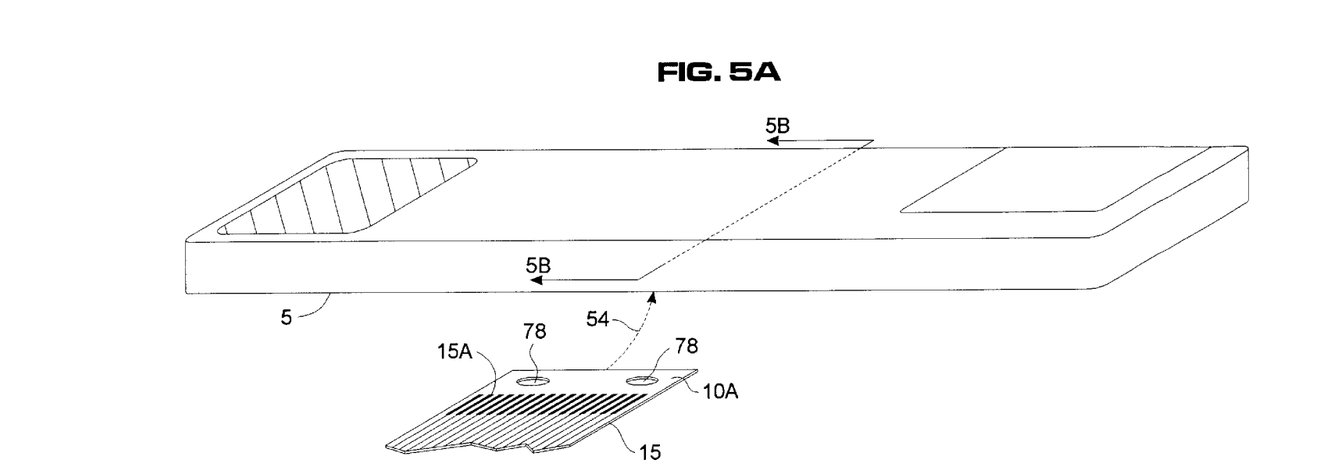
FIG. 5A is a partial perspective view illustrating connection of the tail conductors to a printed circuit board inside the electronic module.
Figure 5B:
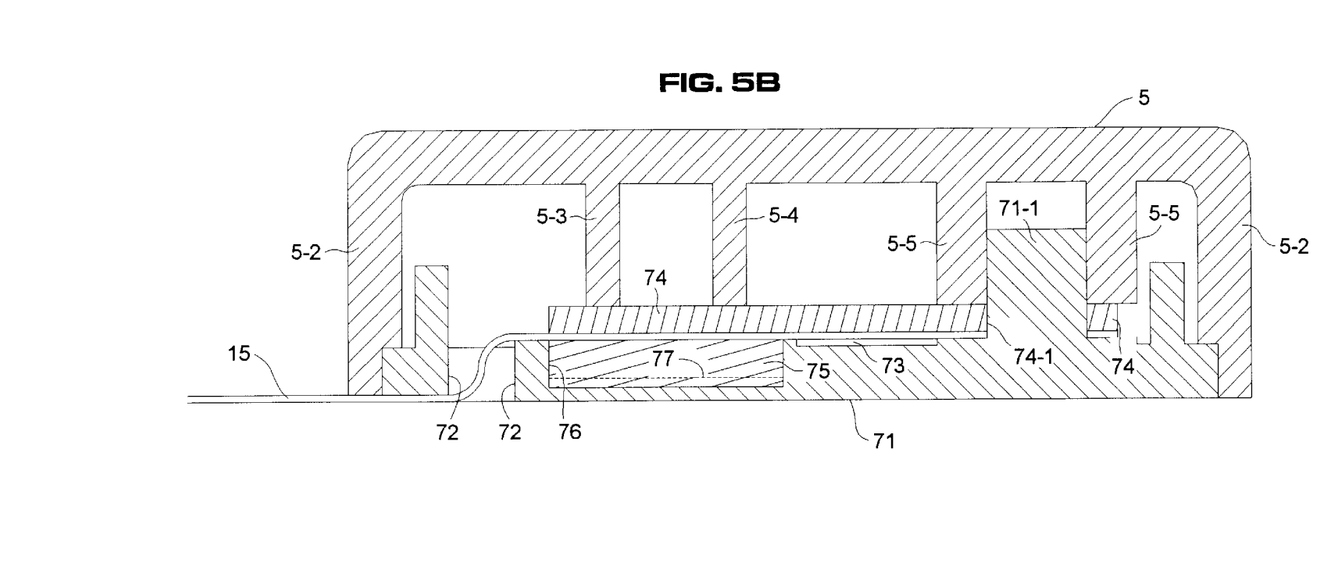
FIG. 5B is a section view taken along section lines 5B—5B of FIG. 5A.

MYLAR switch assembly 10, subsequently described, is attached to the inner surfaces of cover 2. Pages 4, when stitched and folded as shown, are positioned on the inner surfaces of MYLAR switch assembly 10 as indicated by dotted lines and arrows 20A and 20B in FIG. 5. Specifically, fly sheet 19A is glued to the inner surface of MYLAR switch assembly 10 over front cover 2B, and fly sheet 19B also is glued to the inside surface of MYLAR switch assembly 10 over back cover 2A. The various book pages are attached together by stitching them along their fold line 14A (FIG. 6) which is aligned with a center line 14 of cover 2, as shown in FIG. 4. MYLAR switch assembly 10 includes a "tail" 15 which includes "tail" conductors 15A connected to each of the "x" conductors 33 and "y" conductors 34 (FIG. 8) respectively, in the rectangular array of membrane switches 11 in MYLAR membrane switch assembly 10. The terminals 44 of the integrated sound/voice chip 41 (FIG. 10) are electronically connected as shown in FIGS. 5A and 5B to the ends of the various tail conductors 15A. A cosmetic cover or tape 16 (FIG. 3) is positioned as indicated by arrows 21 to cover the conductors 15A on tail 15 except for their end terminal portions which are electrically connected to terminals 44 of sound/voice chip 41.

Referring to FIGS. 5A and 5B, arrow 54 in FIG. 5A generally indicates where tail 15, which includes tail portion 10A of MYLAR membrane switch assembly 10 and tail conductors 15A, is connected into electronic module 5. Electronic module 5 includes an upper housing 5-1 having a vertical wall 5-2 and a number of interior posts 5-3 and 5-4, and socket 5-5. Electronic module 5 also has a base section 71 that covers the open bottom of housing 5. Base section 71 includes a slot 72 through which the tail 15 of MYLAR membrane switch assembly 10 extends. A recess 76 is formed in base section 71, and a resilient insert 75 is positioned in recess 76. A pair of indexing posts 71-1 extend upward from base section 71 into socket 5-5.

The upper housing portion 5-1 of electronic module 5 is preassembled to include an attached printed circuit board 74 including the circuitry shown in FIG. 10. Voice chip 41 of FIG. 10 is bonded to the lower surface of printed circuit board 74, as are the terminals 44. A cavity 73 in base section 71 provides clearance for chip 41. The various terminals 44 are aligned immediately above exposed portions of corresponding tail conductors 15A to which they are electrically connected, respectively. When upper section 5-1 is rigidly attached to base 71, with tail section 15 positioned as shown, with indexing post 71-1 extending through indexing hole 78 in tail section 15, the thickness of resilient pad 75 is such that it urges the tail conductors 15A tightly into contact with the corresponding terminals 44. Preferably, spaced parallel ridges 77 aligned with tail conductors 15A are provided in the bottom of recess 76 (or on resilient pad 75) to concentrate the upward forces of resilient pad 75 onto the tail conductors 15A as much as possible.

Figure 6:
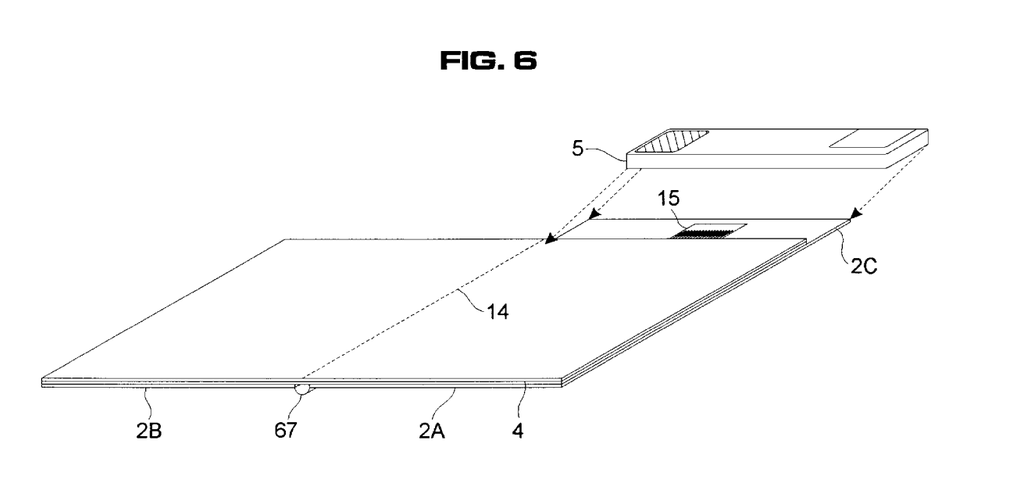
FIG. 6 is a perspective view illustrating attachment of the electronic module onto a shelf section of the back cover.

FIG. 6 shows how electronic module 5 is attached to shelf 2C of back cover 2A. The electronic module 5 includes the terminals 44 connected to the voice chip 41, as shown in FIG. 10. These terminals 44 are electrically connected to the various conductors on tail 15 and then the electronic module 5 is attached (by means of conventional adhesive) to the shelf portion 2C of back cover 2A.

Figure 6A:
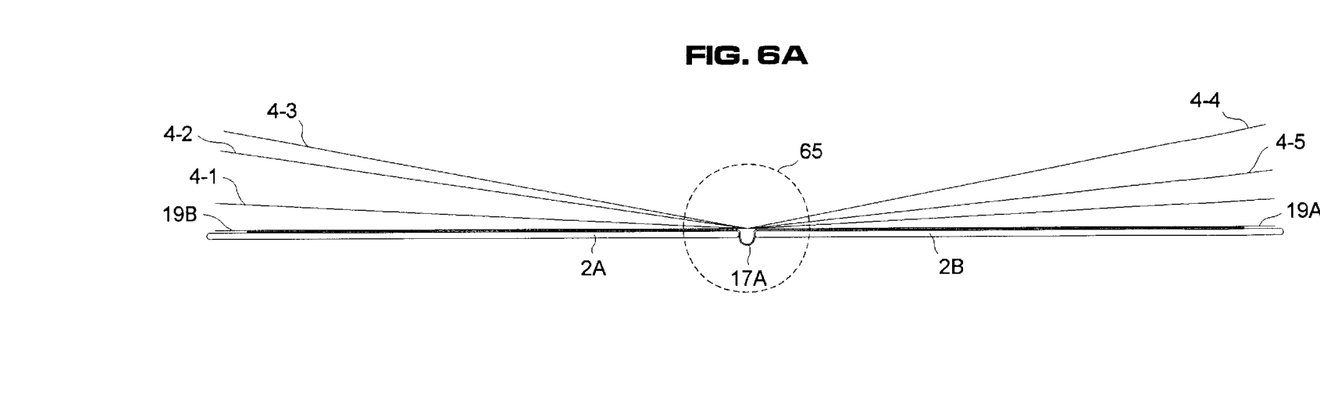
FIG. 6A is a partial side view of the electronic book as shown in FIG. 6 with the pages fanned out.
Figure 6B:
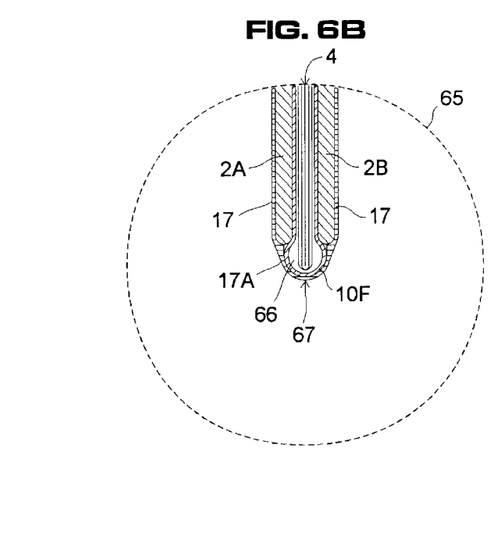
FIG. 6B–6D are enlarged section views of detail 65 of FIG. 6A showing the book closed, partially open, and fully open, respectively.
Figure 6C:
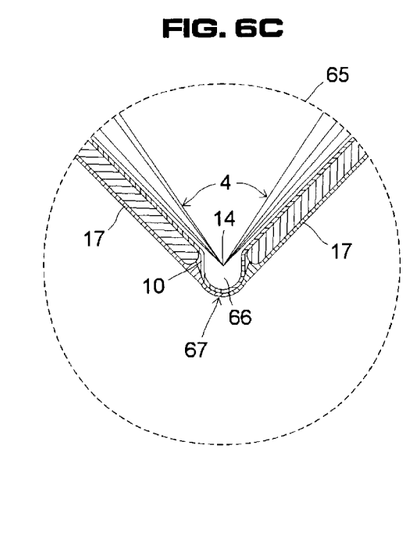
Figure 6D:
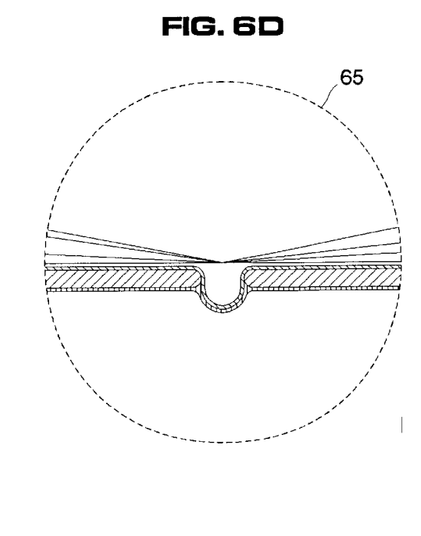

A portion of the lower sheet of MYLAR membrane switch assembly 10, when attached to the inner surfaces of back cover 2A and front cover 2B, forms a hinge portion or spine 67 along center line 14, as indicated in FIG. 6. Spine 67, best shown in FIG. 6A and especially FIGS. 6B–6D, is a composite structure formed of a portion 10F of MYLAR membrane switch layer 10 between the inner surfaces of back cover 2A and front cover 2B. The other portion of spine 67 is a portion 17A of the cover paper 17 which is not attached to the outer surface of portion 10F of MYLAR membrane switch assembly 10. A volume 66 enclosed by spine 67 accommodates the fold line portion 14 of the page assembly 4. An advantage of spine structure 67 is that the lower portion of the sheet of the MYLAR material used in the MYLAR membrane switch assembly is also used as the main hinge element, so no separate hinge or spine structure is needed. This lowers the cost of materials and facilitates the manufacturing process. Attachment of the components as previously described automatically creates the spine 67. The MYLAR hinge forms a much stronger spine than is present in conventional books. The hinge or spine section 67 forms a gradual arc, and avoids the need for preforming a sharp crease in the MYLAR hinge that could cause cracking of conductors crossing the hinge or spine section 67.

The construction and operation of the membrane switches according to the present invention now will be described with reference to FIGS. 7, 7A–C, 8, and 9. FIG. 7 shows MYLAR sheet 10 with tab or tail section 10A on which the "tail" 15 including all of the tail conductors 15A are printed to provide the above described connections to corresponding terminals 44 of electronic module 5. To fabricate the array of membrane switches 11, at least three different printing operations are performed on various sections of MYLAR sheet 10. Reference numeral 22 indicates the first layer to be printed thereon in a first pass. Layer 22 is a pattern of conventional conductive ink, and includes a central portion located between fold lines 10D and 10E and two outer portions formed on sections 10B and 10C. The first conductive pattern 22 includes an array of individual "anode/cathode" patterns 27, one of which is shown in detail in FIG. 7A.

Figure 7A:
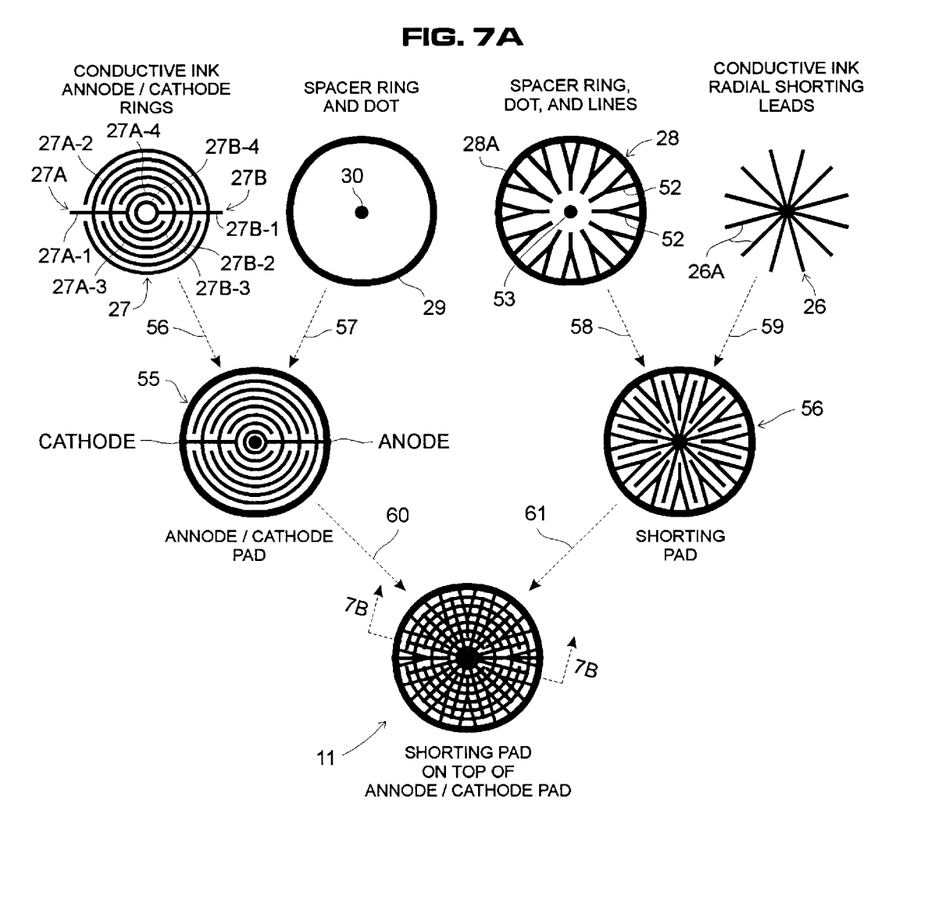
FIG. 7A is a tree diagram illustrating how the printed components of one membrane switch are combined according to the present invention.

Referring to FIG. 7A, each anode/cathode pattern 27 includes a "cathode" portion 27A and an "anode" portion 27B. (For convenience, and for lack of a better term with which to distinguish between the terminals of the membrane switches described herein, one terminal is referred to as the "anode" and the other terminal is referred to as the "cathode", although this use of these terms is not intended to suggest any analogy between the membrane switch electrodes and the electrodes of a diode.) Cathode portion 27A includes a single radial line 27A-1 which is connected to concentric partial rings 27A-2, 27A-3, and 27A-4, all of which are spaced from anode section 27B. Anode section 27B includes a single radial line 27B-1 which is electrically connected to concentric partial rings 27B-2, 27B-3, and complete ring 27B-4, all of which are concentric with and spaced from the partial rings of cathode portion 27A. First conductive pattern 22, formed in the first printing pass, includes two arrays of cathode conductor-to-anode conductor electrical "shorting" patterns 26, one on section 10B of MYLAR sheet 10 and the other on section 10C thereof. One electrode shorting pattern 26 is provided for each anode/cathode pattern 27. One of the conductive ink radial shorting patterns 26 formed during the first printing pass 22 in FIG. 7 is shown in FIG. 7A. Each conductive shorting pattern 26 includes a number of symmetrically positioned radial shorting leads 26A, all connected together at the center.

As shown in FIG. 7, the anode/cathode patterns 27 are arranged in a matrix of rows and columns. The cathode portion 27A of each of the anode/cathode patterns in a particular column are connected to a corresponding column conductor segment 34 that is routed as a tail conductor 15A to tail section 15 for connection to a corresponding terminal 44 of electronic module 5. (The left column conductor 34-1 is not segmented because it does not need to cross over any of the row conductors 33.) Similarly, the anode portion 27B of each of the anode/cathode patterns 27 in a particular row is connected to a corresponding row conductor 33, which also is routed as a tail conductor 15A to tail section 15 for electrical connection to a corresponding terminal 44 of electronic module 5.

A second printing pass forms the insulative spacer pattern indicated by numeral 23 in FIG. 7, which can be composed of dielectrically insulative material. Insulative spacer pattern 23 includes, in the center portion 10A of the sheet of which MYLAR membrane switch assembly 10 is composed, an array of insulative spacer rings 29 and corresponding insulative spacer dots 30 formed in the center of each spacer ring 29, respectively. Insulative pattern 23 also includes an array of crossover spacers 31 (FIGS. 7 & 8) allowing the column conductor segments 34 to cross over the row conductors 33 in section 10A of MYLAR sheet 10 without shorting thereto. In the outer "fold over" sections 10B and 10C of MYLAR sheet 10, printed pattern 23 includes an array of insulative spacer patterns 28. One such pattern 28 is shown in detail in FIG. 7A. It includes an outer spacer ring 28A, a number of generally radial lines 52, and a center spacer dot 53. (Note that the portions of insulative pattern 23 that merely function as spacers, rather than insulators, do not need to be of dielectric or insulative material.)

The spacer ring/dot patterns 29,30 are concentrically aligned with the corresponding anode/cathode patterns 27. The crossover dots 31 are aligned with the "crossover intersections" of column conductor segments 34 and row conductors 33 as shown in FIGS. 7 and 8. Arrows 56, 57, 58 and 59 in FIG. 7A illustrate precisely how corresponding anode/cathode conductive patterns 27, insulative spacer rings 29, shorting patterns 26, insulative dots 30, and insulative patterns 28 are aligned and superimposed to form the halves of individual membrane switches 11.

A final printed pattern, indicated by numeral 24 in FIG. 7, includes a number of short "crossover" conductors 32 that connect the ends of column conductor segments 34 produced during the printing of pattern 22, allowing column conductor segments 34 of each column to form single column conductors that "cross over" row conductors 33.

It should be appreciated that multiple printing passes may be made to increase the thicknesses of the various dielectric spacer patterns and/or the conductive patterns indicated by numerals 22, 23 and 24 in FIG. 7.

After all of the conductors 22, insulators 23, and cross over conductors 24 have been printed on MYLAR sheet 10, the end portions 10B and 10C of sheet 10 are folded about fold lines 10D and 10E, respectively, in the manner indicated by arcs 35A and 35B in FIG. 9. This produces the alignment of the corresponding patterns 55 and 56 in FIG. 7A as indicated by arrows 60 and 61 in FIG. 4 to provide each membrane switch 11 of the final membrane switch array 10.

Figure 7B:
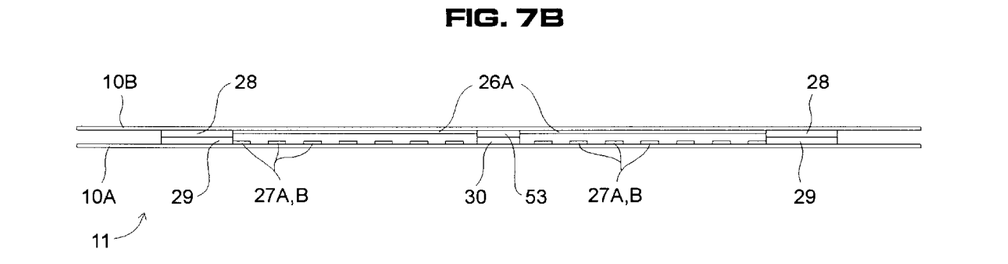
FIG. 7B is a section view along section line 7B—7B of Fig.

A section view of one completed membrane switch 11 along section line 7B—7B of FIG. 7A is shown in FIG. 7B. It can be seen that the insulative spacer dots 30 and 53 and the spacer rings 28 and 29 formed on the portions 10A and 10B of MYLAR sheet 10 cause the radial shorting leads 26A to be positioned directly above and spaced from the cathode conductor rings 27A and the anode conductor rings 27B.

Figure 7C:
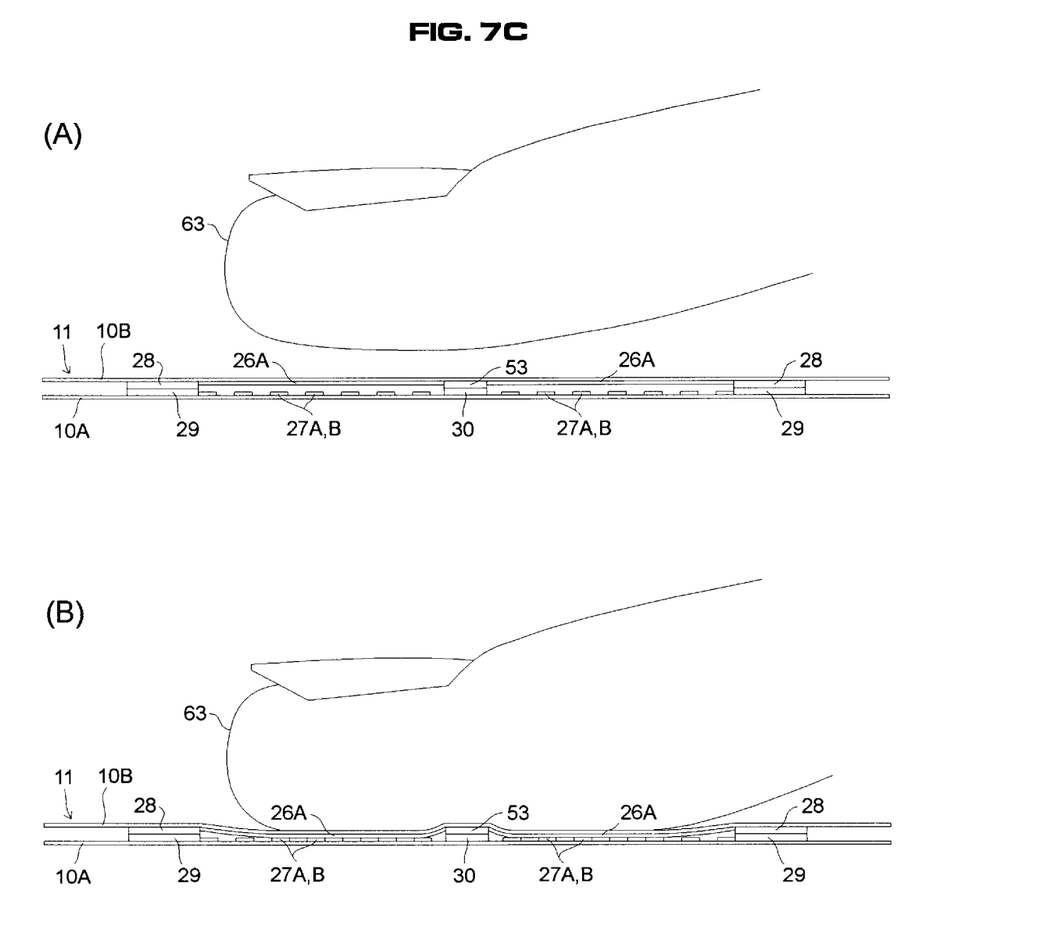
FIG. 7C is a section view diagram similar to FIG. 7B, showing the membrane switch in un-actuated and actuated configurations.

FIG. 7C shows how a membrane switch 11 is actuated. Portion "A" in FIG. 7C shows a finger 63 aligned with membrane switch 11. In portion "B" of FIG. 7C, finger 63 presses on the folded MYLAR sheet portion 10B of membrane switch 11 (through the overlying pages 4, which are omitted for convenience of illustration), pressing the radial shorting leads 26A against the inter-leaved conductive anode and cathode rings 27A,B, thereby electrically shorting the cathode 27A of membrane switch 11 to the anode 27B thereof. This causes the column conductor 34 and the row conductor 33 (FIG. 8) connected to the actuated membrane switch 11 to be electrically shorted together, sending a signal identifying which membrane switch 11 was depressed to electronic control module 5, which decodes that signal and generates a stored sound and/or voice pattern to be emitted by speaker 7.

FIG. 10 shows a circuit schematic diagram of control module 5. Voice chip 41 can be a model MSS6603, commercially available from Mosel-Vitelic Inc. of Taiwan and widely used in the electronics industry. Terminals 42 and 52 in FIG. 10 are connected to the positive and negative terminals of a battery. Capacitor 47 is a bypass capacitor. Output transistor 46 has its base connected by conductor 50 to the audio output terminal $C_{OUT}$ of voice chip 41. The emitter of output transistor 46 is connected by conductor 51 to the negative battery terminal. The collector of transistor 46 is connected by conductor 45 to one terminal of speaker 7, the other terminal of which is connected by conductor 42 to the positive battery terminal. Resistor 43 performs the function of controlling the internal clock frequency of voice chip 41. The various inputs of voice chip 41 connected to terminals 44 allow voice chip 44 to identify which membrane switch 11 has been depressed and select a stored voice message corresponding to the pressed indicia 12 to be output to speaker 7.

The above described embodiment of the electronic book of the present invention includes one or more of the switches 11 connected in parallel, so that they are, in effect, "wire-ORed". Therefore, if any of such parallel-connected or "duplicate" switches is actuated, the common row conductor 33 and column conductor 34 shared by such switches will be electrically shorted together, and hence will cause the same sequence of sounds to be generated by voice chip 41 as if any of such other parallel-connected switches is actuated. In FIG. 8, numeral 11-1 is a "duplicate" switch that is connected in parallel with switch 11-2. As many duplicate switches can be provided as desired for a particular electronic book having a particular theme. Also, it may be very useful to provide various indicia on different locations of different pages, which indicia all correspond to the same sequence of sounds by triggering the same pair of voice chip terminals 44. Use of such duplicate switches is very economical because no additional tail conductors 15A and additional identical stored sound patterns in voice chip 41 are required.

The above described use of segmented column conductors in conjunction with spot insulators 31 and jump conductors 32 (FIG. 7) provides a substantial advantage by avoiding the need to provide insulative layers with via or "feed-through" holes to allow use of orthogonal row conductors 33 and column conductors 34. Use of orthogonal row and column conductors allows "decoding at the switch level" and therefore greatly reduces the number of tail conductors 15A needed. It should be appreciated that it would be very difficult to provide as many switches as might be desired if each anode switch terminal and each cathode switch terminal had to be connected only to one corresponding tail conductor 15A. This would be the situation if the orthogonal row and column conductors 33 and 34 could not be inexpensively implemented; it is the use of spot insulators 31 and jump conductors 32 that achieves this economically.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, even though column conductors 34 and row conductors 33 as disclosed achieve "decoding at the switch level" and thereby reduce the number of tail conductors 15A, in some applications it may be very practical to simply connect each membrane switch anode to only one or a few corresponding tail conductors and to connect each cathode conductor to only one or a few tail conductors 15A. Or, it may be desirable to connect only one or a few anode conductors to a particular tail conductor 15A and to correspondingly connect only one or a few cathode conductors to a particular tail conductor 15A. Although a particular preferred configuration is shown for the membrane switches 11, various other configurations of shorting pads could be used, and various other implementations of interleaved or even non-interleaved anode conductors and cathode conductors could be used. The insulative patterns also could be considerably different than those disclosed. It would be possible to use the disclosed arrangement with spot insulators 31, segmented column conductors 34, and jump conductors 32 in an arrangement in which the anode conductors and cathode conductors of each switch are on different surfaces, rather than the same surface as disclosed.

What is claimed is:

1. An electronic book, comprising in combination:
   (a) a cover;
   (b) an array of membrane switches disposed in a membrane switch assembly attached to the cover;
   (c) a plurality of pages attached to the cover, each of the pages having on a first surface thereof an indicia located directly over one of the switches, respectively;
   (d) an electronic module attached to the cover and electrically connected to the array of switches, the electronic module storing a plurality of sound sequences;
   (e) the membrane switch assembly including
      i. a first layer of flexible sheet material, and a layer of switch electrode conductors on the first layer of flexible sheet material defining a plurality of pairs of switch electrode conductors, each pair including a first electrode conductor and a second electrode conductor, and a plurality of conductors for connecting the electrode conductors to the electronic module;
      ii. a second layer of flexible sheet material and a layer of electrode shorting conductors on the second layer of flexible sheet material, each electrode shorting conductor being directly above one of the pairs of switch electrode conductors, respectively;
      iii. a plurality of spacers disposed between the first and second layers of flexible sheet material; and
   (f) each membrane switch including one of the pairs of a first electrode conductor and a second electrode conductor, one of the spacers, and one of the electrode shorting conductors, spacers of each membrane switch separating the electrode shorting conductor from the first electrode conductor and the second electrode conductor of the membrane switch when it is not activated, and allowing the second layer of flexible sheet material to be pressed against the second electrode conductor and first electrode conductor in response to pressure on the indicia corresponding to that membrane switch so that the electrode shorting conductor makes electrical contact with both the second electrode conductor and the first electrode conductor to transmit a signal corresponding to that membrane switch and that indicia via a pair of conductors to the electronic module to cause it to address a corresponding stored sound sequence.

2. The electronic book of claim 1 further including a sound transducer in the electronic module, and wherein the electronic module scores a voice message corresponding to each membrane switch, respectively, and causes the sound transducer to produce the voice message in response to the electrical contacting of the electrode shorting conductor to both the first electrode conductor and second electrode conductor of that membrane switch.

3. The electronic book of claim 1 wherein, in each of the membrane switches, the first electrode conductor and the second electrode conductor include a plurality of interleaved elongated sections.

4. The electronic book of claim 3 wherein the elongated sections are semicircular and concentric.

5. The electronic book of claim 4 wherein, in each of the membrane switches, the electrode shorting conductor includes a plurality of radial spokes extending from a central portion concentric with the elongated sections.

6. The electronic book of claim 5 wherein each of the membrane switches includes an spacer which is a ring concentric with and of larger radius of curvature than any of the elongated sections of the first electrode conductors and the second electrode conductors.

7. The electronic book of claim 6 wherein each of the membrane switches includes an spacer which is a dot concentric with the elongated sections of the first electrode conductors and second electrode conductors.

8. The electronic book of claim 7 wherein the second electrode conductor of each of the membrane switches in any column of the array is connected to a corresponding column conductor connected to the electronic module, and wherein the first electrode conductor of each of the membrane switches in any row of the array is connected to a corresponding row conductor connected to the electronic module.

9. The electronic book of claim 8 including a plurality of crossover insulators disposed between each of a plurality of row conductors and each of a plurality of column conductors to allow the column conductors to cross over the row conductors.

10. The electronic book of claim 9 wherein the first electrode conductors, second electrode conductors, and electrode shorting conductors are conductive ink printed on flexible sheet material including the first and second layers.

11. The electronic book of claim 10 wherein some of the spacers are printed on the first layer of flexible sheet material and some of the spacers are printed on the second layer of flexible sheet material.

12. The electronic book of claim 6 wherein each of the membrane switches includes an spacer which includes an insulative ring concentric with the elongated sections of the first electrode conductors and the second electrode conductors and a plurality of generally radial, insulative spoke sections extending inward from and such insulative ring between the radial spokes of the electrode shorting conductor.

13. The electronic book of claim 1 wherein the cover includes a back cover and a front cover, the front cover including a first piece of board material and the front cover including a second piece of board material, a piece of flexible sheet material being adhesively attached to inner surfaces of the first and second pieces of board material and forming a hinge therebetween.

14. The electronic book of claim 1 wherein the first layer of flexible sheet material is integral with the second layer of flexible sheet material, the second sheet of flexible sheet material being folded onto the first.

15. The electronic book of claim 14 wherein a portion of the book cover extends beyond the front cover and the electronic module is attached to such portion of the book cover.

16. The electronic book of claim 1 wherein one of the pages includes more than one indicia thereon.

17. The electronic book of claim 16 wherein some of the membrane switches are aligned with only one of the indicia.

18. The electronic book of claim 16 wherein one of the membrane switches is aligned with a plurality of the indicia on different pages.

19. The electronic book of claim 1 wherein first and second membrane switches are connected in parallel so if either of the first and second membrane switches is actuated the pair of conductors is electrically shorted together.

20. The electronic book of claim 1 including a cutout in the cover exposing one of the indicia, to allow pressure on the exposed indicia to actuate a corresponding membrane switch and produce in response a sound sequence while the cover is closed.

21. The electronic book of claim 1 wherein the cover includes a front cover board and a back cover board, the membrane switch assembly including first and second portions adhesively attached to inside surfaces of the front and back cover boards, respectively, a portion of the membrane switch assembly forming a hinge and spine connecting the front and back covers.

22. The electronic book of claim 21 including a cutout in the cover exposing a membrane switch in the first portion of the membrane switch assembly, to allow pressure on the exposed membrane switch to activate it and produce in response a second sequence while the cover is closed.

23. The electronic book of claim 1 wherein the spacers are composed of electrically insulative material.

24. An electronic indicia bearing device comprising in combination:

(a) a substrate;

(b) an array of membrane switches disposed in a membrane switch assembly attached to the substrate;

(c) an indicia located directly over one of the switches, respectively;

(d) an electronic module attached to the substrate and electrically connected to the array of switches, the electronic module storing a plurality of sound sequences;

(e) the membrane switch assembly including
  i. a first layer of flexible insulative sheet material, and a layer of switch electrode conductors on the first layer of flexible sheet material defining a plurality of pairs of switch electrode conductors, each pair including a first electrode conductor and a second electrode conductor, and a plurality of conductors for connecting the electrode conductors to the electronic module;
  ii. a second layer of flexible sheet material and a layer of electrode shorting conductors on the second layer of flexible sheet material, each electrode shorting conductor being directly above one of the pairs of switch electrode conductors, respectively;
  iii. a plurality of spacers disposed between the first and second layers of flexible sheet material; and (f) each membrane switch including one of the pairs of a first electrode conductor and a second electrode conductor, one of the spacers, and one of the electrode shorting conductors, spacers of each membrane switch separating the electrode shorting conductor from the first electrode conductor and the second electrode conductor of the membrane switch when it is not activated, and allowing the second layer of flexible sheet material to be pressed against the second electrode conductor and first electrode conductor in response to pressure on the indicia corresponding to that membrane switch so that the electrode shorting conductor makes electrical contact with both the second electrode conductor and the first electrode conductor to transmit a signal corresponding to that membrane switch and that indicia via a pair of conductors to the electronic module to cause it to address a corresponding stored sound sequence.

25. The electronic indicia bearing device of claim 24 wherein the first electrode conductor of each of the membrane switches is connected to a corresponding first conductor, and the second electrode conductor of each of the membrane switches is connected to a corresponding second conductor, the electronic indicia bearing device further including a plurality of crossover insulators disposed between various first conductors and various second conductors to allow the various first conductors to cross over the various second conductors.

* * * * *